United States Patent

Oken

[15] 3,649,307

[45] Mar. 14, 1972

[54] BINDER FOR ZINC-RICH PAINT

[72] Inventor: Aaron Oken, Kennett Square, Pa.

[73] Assignee: E. I. du Pont de Nemours and Company, Wilmington, Del.

[22] Filed: Feb. 11, 1969

[21] Appl. No.: 800,361

Related U.S. Application Data

[63] Continuation of Ser. No. 715,559, Mar. 25, 1968, abandoned, and a continuation-in-part of Ser. No. 460,516, June 1, 1965, abandoned.

[52] U.S. Cl. ..........................106/1, 106/14, 106/287 SE, 117/135.1, 117/160 R, 260/448.8 A
[51] Int. Cl. ........................................................C09d 5/10
[58] Field of Search..........................106/1, 14, 287 BE, 84; 117/135.1, 160; 260/448.8 A

[56] References Cited

UNITED STATES PATENTS

| | | | |
|---|---|---|---|
| 3,368,928 | 2/1968 | Chadha et al. | 148/6.2 |
| 3,392,036 | 7/1968 | McLeod | 106/1 |
| 3,056,684 | 10/1962 | Lopata et al. | 106/1 X |

*Primary Examiner*—Lorenzo B. Hayes
*Attorney*—Frederick F. Butzi

[57] ABSTRACT

Compositions identical to those obtained by treating ethyl polysilicate with boric acid, in an organic solvent for the boric acid, at reflux temperature.

The compositions are useful as binders for zinc-rich paints.

6 Claims, No Drawings

BINDER FOR ZINC-RICH PAINT

CROSS-REFERENCE TO RELATED APPLICATIONS

This application is a continuation-in-part of application Ser. No. 460,516, filed June 1, 1965, and application Ser. No. 715,559, filed Mar. 25, 1968, both now abandoned.

BACKGROUND OF THE INVENTION

This invention relates to a novel class of silicate materials and to zinc-rich, anticorrosive coating compositions including these materials.

Coating compositions containing a substantial quantity of metallic zinc dust and employing silica ($SiO_2$) as a binder for the zinc, are known to provide excellent cathodic anticorrosion protection for steel substrates. A wide variety of compositions are available commercially for this and related purposes, and the theory of the protective action and an identification of many suitable compositions are documented in technical literature such as Paint Manufacture, Vol. 34, No. 1, pages 41–46, and Vol. 34, No. 2, pages 51–53 (1964) and Paint and Varnish Production, Vol. 54, No. 5, pages 87–94 and the July 1964 issue, pages 75–76, as well as the patents and articles discussed therein.

A common practice in the art heretofore has been to prepare a dispersion of zinc dust in a sodium silicate solution which is applied to the substrate to be coated. The dispersion had to be prepared just prior to use. After application, the resulting coating is subjected to an acid treatment to convert the sodium silicate to silica. This procedure is effective when done properly, but it is an extremely exacting technique. The acid treatment must be carried out at a precise critical time after the initial coating is applied. If the acid treatment is used too soon, the coating is washed off the substrate. On the other hand, if the acid treatment is used after the critical time period has elapsed, the acid cannot penetrate the coating so as to convert all of the sodium silicate to silica, and accordingly the final coating does not provide the requisite anticorrosive properties.

Another common commercial practice in the art heretofore has been to prepare a solution of the zinc dust and ethyl polysilicate which is applied to the substrate to be coated. The ethyl polysilicate then hydrolyzes to silica by reaction with atmospheric moisture. The primary drawback to this technique is that the hydrolysis reaction is very slow, usually requiring several days to harden the coating. In the meantime the initial coating provides no protection. Furthermore, until the hydrolysis reaction is complete, the coating remains very soft, is easily damaged, and may be washed off if exposed to rain.

SUMMARY OF THE INVENTION

It has now been found that these shortcomings can be eliminated if the binder used for the zinc-rich paint is a composition obtained by treating ethyl polysilicate with boric acid.

The compositions of the invention, when formed to a film of but a few mils thickness, i.e., 1 to 15 mils, rapidly hydrolyze to a hard film under the influence of the moisture present in air. Pigmented paints can be prepared therefrom, and another important aspect of the invention is a coating composition or paint comprising 50 through 94 percent of its total weight of particulate zinc and 6 to about 50 percent of its total weight of the composition described above.

This invention therefore provides a polysilicate binder which can be mixed with particulate zinc and thereafter applied as a coating composition on a substrate. Whereas the zinc-rich coating compositions of the prior art either require very exacting application techniques or else require very prolonged hardening times, the polysilicate binders of this invention provide zinc-rich coating compositions which may be simply sprayed, or applied in any other convenient manner, onto a substrate and which then harden to give hard, cathodic anticorrosion coatings for steel and other ferrous metal substrates.

In applying the new paints, conventional practices in providing a clean substrate are employed. These may include such practices as sanding with abrasives, wire brushing, pickling, vapor degreasing and other known practices.

The polysilicate binders of this invention are prepared by treating ethyl polysilicate (also known as condensed or partially hydrolyzed tetraethyl orthosilicate) with boric acid.

The ethyl polysilicate to be employed has the formula

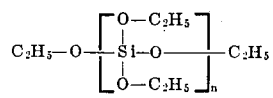

wherein $n$ is a number of from 2 to about 10.

As produced and available commercially, the ethyl polysilicate actually is a mixture of polysilicates of varying molecular weights, i.e., is a mixture of compounds according to the formula but having different values for $n$ ranging from 2 to about 10. Frequently the commercial mixtures are designated by their silica ($SiO_2$) content, as by a number following the name of the mixture. In a preferred mixture for this invention the value for $n$ in the formula averages about 5 to 6 and the composition contains about 40 percent of $SiO_2$, by weight. These compositions are available commercially and the manner of preparing them is disclosed in the technical literature, for example, in The Industrial Chemist, Vol. 33, pages 55 to 58 (1957) and the U.S. patent to Lopata et al. U.S. Pat. No. 3,056,684.

The silicate compositions of the invention are prepared by treating ethyl polysilicate with boric acid by heating in the presence of an organic solvent for the acid, preferably at about the reflux temperature of the mixture. Either orthoboric acid or metaboric acid can be employed with orthoboric acid being preferred.

The treatment is carried out under substantially moisture-free conditions with the starting materials being employed in a ratio that provides, by weight, about 1 to 25 parts of boric acid per 100 parts of ethyl polysilicate.

The treatment is carried out at moderately elevated temperatures within the range of about 70° to 140° C.; heating beyond about 140° C. is to be avoided, for an insoluble mass may result.

A preferred practice comprises treatment in absolute ethanol at reflux at a temperature of about 80° to 90° C. for about 3 to 6 hours. The compositions prepared in shorter periods are useful, but may, in film form, take longer periods to dry and harden.

The resulting compositions can be used as such to provide coatings on various surfaces, and are particularly useful as subcoats or primer coats over which can be applied coating materials that might not otherwise be useful in conjunction with certain substrates.

The compositions as obtained are film forming and rapidly hydrolyze in that form in the presence of atmospheric moisture to hard coatings. For some purposes it is desirable to dilute the solutions with alcohol, glycol monoethyl ether or like material, and this can be accomplished by simply adding such material at ambient conditions, preferably with stirring. Pigments and extenders or fillers can also be included if desired.

Zinc-rich paints are prepared in accordance with the present invention by dispersing from about 50 to 94 percent (by weight of the total composition) of zinc in 6 to 50 percent (by weight of the total composition) of the liquid silicate product of the invention. The preferred compositions contain about 65 to 85 percent of zinc and 15 to 25 percent of liquid silicate product on this basis. Dispersion of the zinc can be accomplished by stirring the materials together, or mixing in a colloid mill or any other manner desired.

The zinc employed is the conventional zinc dust or zinc flake presently used in preparing zinc-rich paints for anticorrosive applications. Such zinc materials generally have average diameters of from 5–12 microns, preferably 7–8 microns.

Conventional additives to control the consistency of the paint can also be included in the paint compositions, for example, colloidal silica, clays and the like, in any desired amount that does not adversely affect the anticorrosion properties of the resulting paint.

These new zinc-rich paints are outstanding in that they have extended shelf life in the absence of moisture, and when applied to a substrate rapidly convert to a hard coating.

DESCRIPTION OF PREFERRED EMBODIMENTS

The invention will be described further in conjunction with the following examples in which the details are given by way of illustration and are not intended to be limiting. Parts and percentages given are by weight unless otherwise indicated.

EXAMPLE 1

Ethyl silicate "40" (Union Carbide Corporation polysilicate, 40% $SiO_2$, viscosity at 20° C. of 3.9 cps.) in an amount of 485 grams along with 25 grams of boric acid and 130 cc. of absolute ethyl alcohol were charged into a dry flask fitted with a stirrer and reflux condenser with a drying tube. The mixture was heated and refluxed for 3 hours, cooled, and then 65 cc. of glycol monoethyl ether were added. Films of the resulting solution exposed to air were hard in 1 hour. A weighed sample, converted to film by exposure to the air for 24 hours, then baked 4 hours at 150° C., showed a solids content of 40 percent.

EXAMPLE 2

A zinc-rich paint of the invention was prepared by mixing

| | |
|---|---|
| Ethyl silicate "40" | 13.3 parts |
| Boric acid | 1.1 parts |
| Isopropyl alcohol | 4.5 parts |
| Cellosolve | 3.0 parts |

This mixture was refluxed for 2 hours and to it were then added, with stirring, 75.8 parts of zinc dust.

The resulting composition was sprayed on a sandblasted panel of mild steel to a thickness of 3 mils (dry). It dried to a firm finish in 4 hours at 77° F., 80 percent relative humidity, was completely cured in 1 month and provided excellent and extended protection against corrosion.

EXAMPLE 3

A zinc-rich paint of the invention was prepared by mixing

| | |
|---|---|
| Ethyl silicate "40" | 332 parts |
| Boric acid | 25 parts |
| Isopropyl Alcohol | 111 parts |
| Diacetone Alcohol | 73 parts |

This mixture was refluxed for 4 hours and to it were added, with stirring, 1,943 parts of zinc dust.

To this composition were then added, with stirring, 242 parts of xylene. The resulting paint was sprayed on a sandblasted panel of mild steel to a thickness of 1 mil (dry). The composition dried to a hard finish in 20 minutes at room temperature and was completely cured in one month.

From the foregoing discussion and description, it will be apparent that the present invention provides a significant advance in the art of binders and zinc-rich paints. While the invention has been described with respect to specific materials and details, it will be apparent that changes can be made without departing from its scope.

I claim:

1. A composition obtained by bringing together about 100 parts of ethyl polysilicate with from about 1 to about 25 parts of boric acid, in an organic solvent for the boric acid, at a temperature of from about 70° to about 140° C., until their reaction is complete.

2. A paint composition comprising from about 6 percent to about 50 percent of its total weight of the composition of claim 1, and from about 50 percent to about 94 percent of its total weight of particulate zinc.

3. A paint composition comprising from about 15 percent to about 25 percent of its total weight of the composition of claim 1, and from about 65 percent to about 85 percent of its total weight of particulate zinc.

4. The composition of claim 1 wherein the organic solvent is ethanol.

5. A paint composition according to claim 2, prepared using ethanol as the organic solvent.

6. A paint composition according to claim 3 prepared using ethanol as the organic solvent.

* * * * *